Oct. 21, 1924.                                              1,512,403
                         R. J. BURROWS
                       AUTOMOBILE BRAKE
                     Filed March 9, 1922
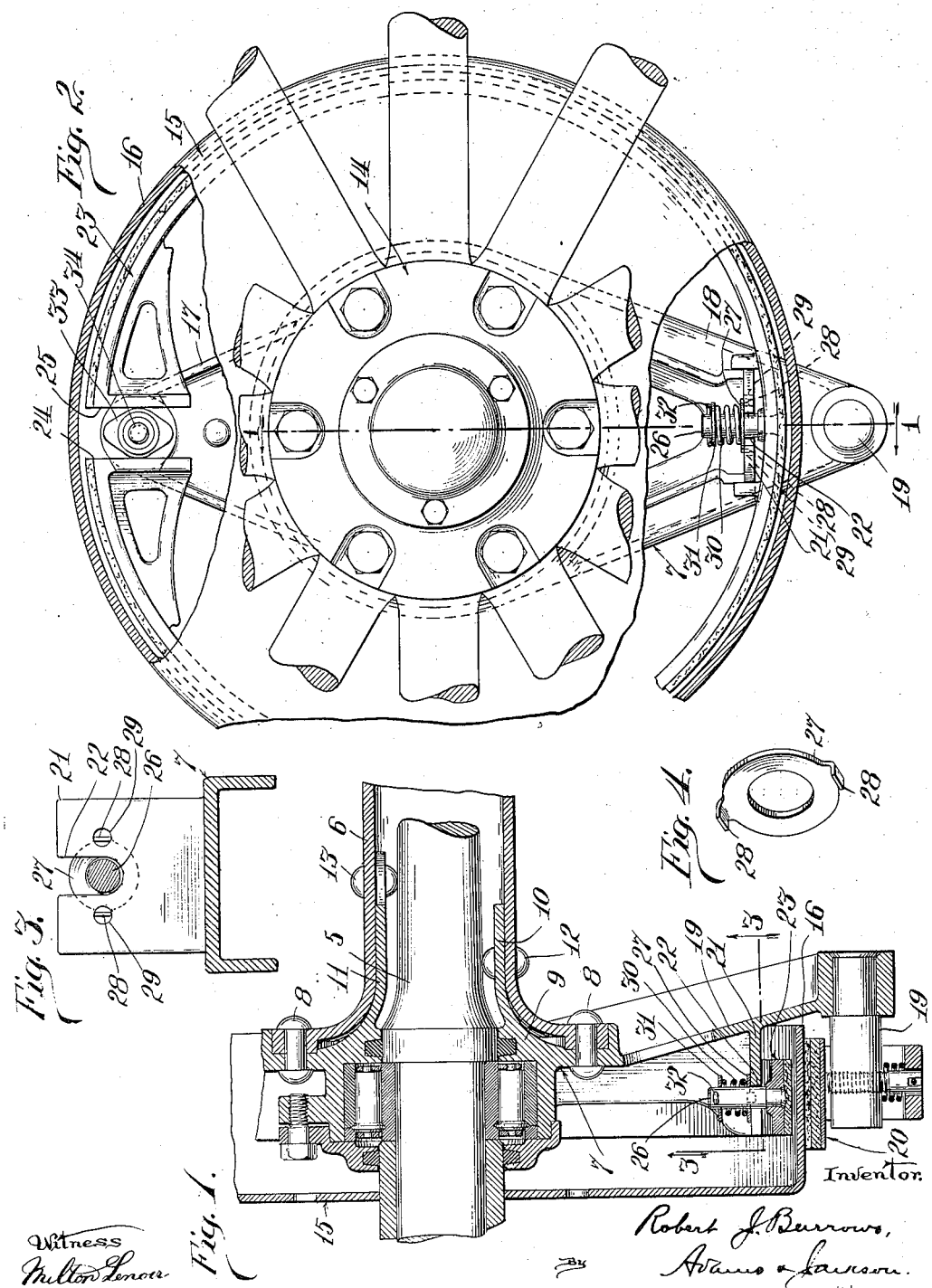

Patented Oct. 21, 1924.

1,512,403

UNITED STATES PATENT OFFICE.

ROBERT J. BURROWS, OF BUCHANAN, MICHIGAN, ASSIGNOR TO CLARK EQUIPMENT COMPANY, OF BUCHANAN, MICHIGAN, A CORPORATION OF MICHIGAN.

AUTOMOBILE BRAKE.

Application filed March 9, 1922. Serial No. 542,321.

*To all whom it may concern:*

Be it known that I, ROBERT J. BURROWS, a citizen of the United States, and a resident of Buchanan, in the county of Berrien and State of Michigan, have invented certain new and useful Improvements in Automobile Brakes, of which the following is a specification, reference being had to the accompanying drawing.

My invention relates to brakes for automobiles or other motor vehicles, and has particularly to do with means for supporting the usual internal or expanding brake shoes which cooperate with the brake drums carried by the rear wheels. Such brake shoes are generally in the form of a circular band split transversely so that the ends so formed may be forced apart by a cam or wedge block to increase the diameter of the shoe and move it forcibly into contact with a cooperating drum, the peripheral portion of which overlies the shoe. The natural resiliency of the shoe causes it to contract when the expanding pressure is removed so that normally it is out of contact with the drum. Obviously, it is desirable that a brake shoe of this character be mounted so that it will be supported firmly, out of contact with but in close proximity to the brake drum, so that the vibration of the vehicle when in use will not cause it to rub against the brake drum and it will be held against rattling, but in such manner that it will be free to expand when the expanding pressure is applied and to move relatively to its support so that all parts of it will evenly engage the drum, and to provide for supporting the shoe so that these desirable results may be obtained is the object of my invention. I accomplish this object as illustrated in the drawings and hereinafter described. What I regard as new is set forth in the claims.

In the accompanying drawings,—

Fig. 1 is a partial longitudinal section of the rear axle of a motor vehicle, taken on line 1—1 of Fig. 2, showing the braking devices and the support for the brake shoe;

Fig. 2 is an elevation partly broken away showing part of one of the vehicle wheels and the internal braking devices, the usual outer brake-band being omitted;

Fig. 3 is an enlarged detail, being a partial cross-section on line 3—3 of Fig. 1; and Fig. 4 is a perspective view of the locking plate or washer.

Referring to the drawings,—5 indicates the rear axle of a vehicle, and 6 a housing therefor. In the construction shown 7 indicates a brake-supporting bracket which is securely attached to the housing 6 by rivets 8 which pass through the hub portion 9 of said bracket and through the outwardly-flared outer end of the housing 6 which fits in a suitable recess in the bracket 7 provided to receive it, as shown in Fig. 1. The hub portion 9 of the bracket is also provided with lugs 10, 11 which fit into the housing 6 and are secured thereto by rivets 12, 13. It will be understood that the manner in which the brake-supporting bracket is secured in place is not a part of my present invention as it may be secured in any suitable way.

Referring to Fig. 2,—14 indicates one of the vehicle wheels to which is attached a brake drum 15 having the usual axially-disposed peripheral portion 16 which forms the braking surface.

As best shown in Fig. 2, the brake-supporting bracket 7 is provided with oppositely-extending arms 17, 18, the arm 18 being preferably extended beyond the peripheral portion 16 of the brake drum where it carries a pin 19 upon which is mounted an external brake band 20 adapted to cooperate with the outer surface of the brake drum in the usual way as shown in Fig. 1. Said arm is also provided with a flange 21 which is axially disposed, i. e., parallel with the axis of the wheel, and extends within the brake drum 15 a short distance from its peripheral portion 16, as best shown in Fig. 1. This flange 21 is provided with an open-ended slot 22 which is also disposed axially, as best shown in Figs. 1 and 3.

The flange 21 is adapted to support an internal brake shoe 23 at a point diametrically opposite the split portion thereof, as shown in Fig. 2, in which the two ends of the brake shoe are indicated by reference numerals 24, 25, respectively. It will be observed that the brake shoe 23 extends between the flange 21 and the peripheral portion 16 of the brake drum, and it is supported by said flange by means of a pin 26 which is secured to the brake shoe and extends radially inward through the slot 22 so that radial movement of that portion of the brake shoe is permitted. Fitted upon the inner end portion of the pin 26 is a lock washer or plate 27 having angularly disposed lugs 28, which are adapted to fit in holes or sockets 29 in the flange 21 at opposite sides of the slot 22, as best shown in Figs. 2 and 3. By this construction, when the lock washer 27 is in place the pin 26 and consequently the brake shoe are held against movement in the slot 22 in an axial direction. The lock washer 27 is held in close contact with the flange 21 by means of a spring 30 fitted upon the pin 26 between said lock washer and a washer 31 fitted upon the inner end of the pin 26 and held in place by a cotter pin 32. The spring 30, therefore, tends to hold the intermediate portion of the brake shoe 23 out of contact with the brake drum and also to prevent rattling. Besides it holds the lock washer 27 down firmly in engagement with the flange 21 and keeps the lugs 28 thereof in operative engagement therewith. If it be desired to dismount the brake shoe, this may readily be done by removing the washers 27, 31 and spring 30 which will permit the pin 26 to be slid out of the slot 22 in an axial direction.

The expansion of the brake shoe 23 is accomplished in the construction shown by means of a cam 33 carried by a rock-shaft 34 which is mounted in the arm 17 of the brake-supporting bracket, as shown at the top in Fig. 2. The cam 33 is shown in the position which it occupies when the shoe is not expanded, and it will be evident that by rotating the rock-shaft 34 the ends 24, 25 of the brake shoe may be forced apart, thereby increasing the diameter of the shoe and causing it to frictionally engage the brake drum. At the same time that portion of the shoe which is opposite the ends 24, 25 will move into engagement with the drum, this being permitted by the capacity of the pin 26 to move longitudinally through the slot 22. When the cam 33 is restored to its normal or inoperative position the shoe will contract and at the same time the pin 26 will move inwardly, thereby carrying the intermediate portion of the shoe out of engagement with the drum. As said pin cannot move endwise of the slot 22 by reason of the action of the lock washer 27, and the pin 26 is normally held in its innermost position by the spring 30, the brake shoe is prevented from rattling when the vehicle is in motion.

It will be understood that the improved brake shoe supporting devices described may with advantage be applied to brake shoes of this type generally, and that my invention is not restricted to the specific construction shown and described, and especially to those features of such construction which are distinct from the means for supporting the intermediate portion of the shoe.

What I claim as my invention and desire to secure by Letters Patent, is—

1. The combination with an expansible circular brake shoe and means for expanding the same, of a brake drum encircling said shoe, a member disposed within said drum for supporting the intermediate portion of said shoe, devices cooperating with said member for normally holding such intermediate portion out of engagement with the drum, but permitting radial movement thereof into engagement therewith, said devices being separable from said member by movement in an axial direction, and means for normally holding said devices against axial movement relatively to said member.

2. The combination with an expansible circular brake shoe and means for expanding the same, of a brake drum encircling said shoe, a member disposed within said drum for supporting the intermediate portion of said shoe, a spring-actuated device cooperating with said member for normally holding such intermediate portion out of engagement with the drum, but permitting radial movement thereof into engagement therewith, said device being separable from said member by movement in an axial direction, and means for normally holding said device against axial movement relatively to said member.

3. The combination with an expansible circular brake shoe and means for expanding the same, of a brake drum encircling said shoe, a brake-supporting bracket extending into said drum and having an axially-disposed slot, a pin carried by the intermediate portion of the shoe and movable radially in said slot, and means for preventing axial movement of said pin in said slot.

4. The combination with an expansible circular brake shoe and means for expanding the same, of a brake drum encircling said shoe, a brake-supporting bracket extending into said drum and having an axially-disposed slot, a pin carried by the intermediate portion of the shoe and movable radially in said slot, means for preventing axial movement of said pin in said slot, and a spring for normally holding the shoe out of engagement with said drum.

5. The combination with an expansible circular brake shoe and means for expanding the same, of a brake drum encircling said shoe, a brake-supporting bracket extending into said drum and having an axially-disposed slot, a pin carried by the intermediate portion of the shoe and movable radially in said slot, and a lock washer fitted on said pin and having interlocking engagement with said bracket whereby axial movement of said pin in said slot will be prevented.

6. The combination with an expansible circular brake shoe and means for expanding the same, of a brake drum encircling said shoe, a brake-supporting bracket extending into said drum and having an axially-disposed slot, a pin carried by the intermediate portion of the shoe and movable radially in said slot, a lock washer fitted on said pin and having interlocking engagement with said bracket whereby axial movement of said pin in said slot will be prevented, and a spring mounted on said pin and operating to hold said lock washer in engagement with said bracket.

7. The combination with a brake-supporting bracket having an axially-disposed slot, of an expansible circular brake shoe, means extending through said slot for connecting the intermediate portion of said shoe with said bracket and permitting radial movement thereof, and means for locking said shoe against axial movement in said slot.

8. The combination with a brake-supporting bracket having an axially-disposed slot, of an expansible circular brake shoe, a pin carried by the intermediate portion thereof and movable radially in said slot, and means for preventing axial movement of said pin in said slot.

9. The combination with a brake-supporting bracket having an axially-disposed slot, of an expansible circular brake shoe, a pin carried by the intermediate portion thereof and movable radially in said slot, means for preventing axial movement of said pin in said slot, and a spring mounted on said pin for normally holding said brake shoe out of operative position.

10. The combination with a brake-supporting bracket having an axially-disposed slot, of an expansible circular brake shoe, a pin carried by the intermediate portion of said shoe and movable radially in said slot, a lock washer adapted to fit on said pin and to interlock with a portion of said bracket, and means for holding said lock washer in engagement with said bracket.

11. The combination with a brake-supporting bracket having an axially-disposed slot, of an expansible circular brake shoe, a pin carried by the intermediate portion of said shoe and movable radially in said slot, a lock washer adapted to fit on said pin and to interlock with a portion of said bracket, and means for holding said lock washer in engagement with said bracket, comprising a spring mounted on said pin and bearing on said lock washer.

ROBERT J. BURROWS.